R. GRIFFITH.
METHOD OF MAKING PNEUMATIC TIRES.
APPLICATION FILED OCT. 10, 1914.

1,149,364. Patented Aug. 10, 1915.

Attest:
E. M. Hamilton.
Ewd R. Tolson.

Inventor:
Richard Griffith,
by Charles E Parsons
Atty.

UNITED STATES PATENT OFFICE.

RICHARD GRIFFITH, OF AKRON, OHIO, ASSIGNOR TO MILLER RUBBER COMPANY, OF AKRON, OHIO, A CORPORATION OF OHIO.

METHOD OF MAKING PNEUMATIC TIRES.

1,149,364.  Specification of Letters Patent.  Patented Aug. 10, 1915.

Application filed October 10, 1914. Serial No. 866,132.

*To all whom it may concern:*

Be it known that I, RICHARD GRIFFITH, a citizen of the United States, residing at Akron, in the county of Summit and State of Ohio, have invented certain new and useful Improvements in Methods of Making Pneumatic Tires, of which the following is a specification.

The present invention relates to improvements in tire casings and provides an improved method of constructing the same.

The invention has for its principal object to provide a tire casing adapted to be constructed upon a ring core or mandrel of circular cross section and treats more particularly with the construction of such a casing as one which contains a cord carcass.

The invention further contemplates a novel method in constructing the cord carcass upon the mandrel and in embodying the bead cores therein during the process of construction.

With these and other objects in view, the invention consists in the novel features, arrangement and construction of parts described more fully in the following specification, illustrated in the accompanying drawings, and pointed out in the appended claims.

Figure 1:
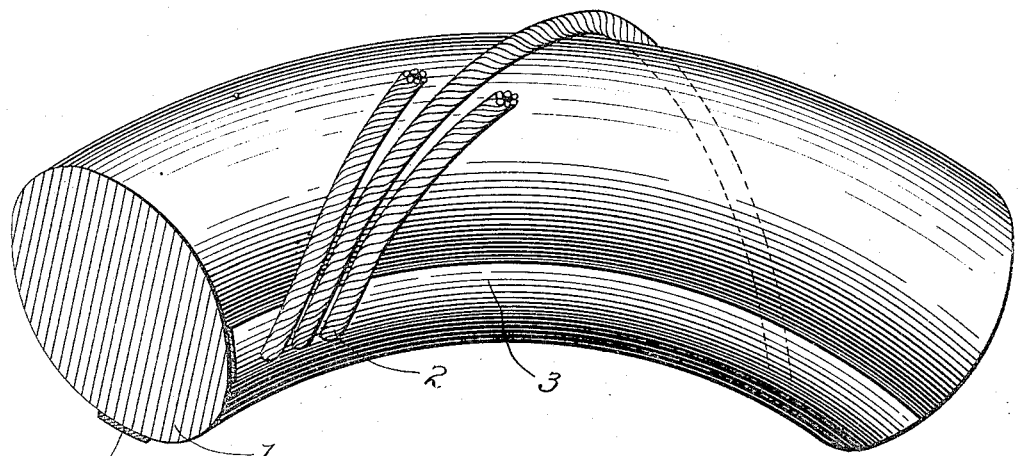
Figure 2:
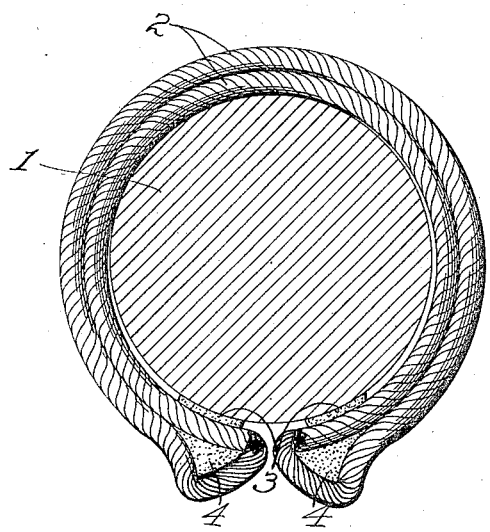

In the drawings: Figure 1 is a perspective view of the ring core showing the manner in which the first ply of cords is applied thereto in constructing the carcass. Fig. 2 is an end elevation showing the complete cord carcass after the bead cores have been built therein.

Referring now to the drawings, a ring core or mandrel 1 of substantially circular cross section is employed, around the outer surface of which the cord carcass of the tire casing is built. The cords 2 of which the carcass of the tire casing is constructed may be of any suitable form but are preferably flexible cords such as could be made by twisting a plurality of rubber coated strands or threads about a central soft core of rubber.

The present invention is not intended to be limited to the type of cord used and a hollow flexible twisted cord may be employed or any similar cord such as for example, that described in applicant's co-pending application filed of even date herewith. The cords used preferably have their exterior surfaces coated with a suitable adhesive material.

Two strips 3 of friction adhesive tape are applied in circular rings at suitable points on either side of the mandrel or core so as to extend circumferentially around the same. The flexible cord 2 employed is then cut into strips of equal lengths and the several individual strips are applied around the core 1 being disposed in parallel relation to one another and at an angle of approximately sixty degrees to the circumferential surface of the core or mandrel. The ends of the cords 2 are brought into contact with the two strips 3 of adhesive tape and held in place thereby. These bead cores 4 will adhere to the surface of the ends of the cords and will be retained in proper position until the second ply of cords of which the carcass is constructed has been applied. This second ply of cords is similarly composed of a plurality of flexible cords previously cut into equal lengths and the cords are applied around the outer surface of the first ply, being disposed at a reverse angle to those of the first ply. Their ends are pressed into contact with the outer surface of the bead cores 4 and will be held there due to the adhesive nature of the latter, thus obviating the necessity of providing second strips of adhesive tape for this ply of cords. It will be understood that the cords of which these plies are composed lie around the surface of the core, being parallel to one another and the distance between the individual cords of the plies may be varied as desired. They are here shown and will preferably be built into the carcass completely out of contact with one another, the distance between them however, varying somewhat due to the differences of the inner and outer circumference of the ring core.

A tire casing in which the cord carcass has been constructed in the above manner would possess all of the advantages of a similar casing, which had been formed by completely wrapping the cords of the separate plies about the ring core and subsequently slitting them along their inner circumference for the purpose of removing the core. The present invention however, possesses certain advantages over the other method. Although this method of constructing a tire casing has been herein described and illustrated with twisted flexible cords as the elements of which the carcass is made up, it nevertheless might be varied without departing from the spirit of my invention, by employing strips of tape or other suitable fabric and applying them in this manner to the ring core or mandrel.

Having thus fully described my invention, what I claim as new and desire to secure by Letters Patent of the United States, is:—

1. The herein described method of manufacturing a carcass for tire casings consisting of cutting equal lengths of flexible rope, having its outer surface coated with suitable adhesive applying strips of adhesive fabric to a ring core at the bead points, applying the lengths of rope around the ring core at an angle to the circumferential surface thereof and securing their ends to the adhesive fabric, substantially as described.

2. The herein described method of manufacturing a tire casing consisting in applying strips of adhesive fabric to a ring core at opposite sides of its inner periphery; cutting equal lengths of a flexible cord having its outer surface coated with an adhesive, applying a plurality of said cord lengths to the ring core in parallel strips to form a ply disposed at an angle to the circumferential surface of the core and securing the ends of said cord lengths to the strips of adhesive fabric, applying bead cores to said ply at suitable points and then applying a second similar ply of parallel cords and securing their ends around and to the bead cores, substantially as described.

In testimony whereof I affix my signature in presence of two witnesses.

RICHARD GRIFFITH.

Witnesses:
C. A. WOLF,
RUSSELL D. BELDEN.

Copies of this patent may be obtained for five cents each, by addressing the "Commissioner of Patents, Washington, D. C."